United States Patent [19]

Taniguchi et al.

[11] Patent Number: 5,612,432

[45] Date of Patent: Mar. 18, 1997

[54] SHEETLIKE ARTICLE FOR OPTICAL USE

[75] Inventors: Takashi Taniguchi, Yasu-gun; Kazuo Tanaka, Gamo-gun; Shinya Adachi; Masaki Maekawa, both of Otsu, all of Japan

[73] Assignee: Toray Industries, Inc., Japan

[21] Appl. No.: 291,353

[22] Filed: Aug. 16, 1994

Related U.S. Application Data

[63] Continuation of Ser. No. 852,229, filed as PCT/JP91/01336 Oct. 3, 1991 published as WO92/06124 Apr. 16, 1992, abandoned.

[30] Foreign Application Priority Data

| Oct. 3, 1990 | [JP] | Japan | 2-267165 |
| Jun. 18, 1991 | [JP] | Japan | 3-146261 |

[51] Int. Cl.$^6$ .............. C08F 222/40; C08F 222/10; C08F 220/10; C08F 236/02; C08F 212/08
[52] U.S. Cl. ............. 526/262; 526/321; 526/328.5; 526/336; 526/347
[58] Field of Search ................. 526/262, 321, 526/328.5, 336, 347

[56] References Cited

U.S. PATENT DOCUMENTS

| 4,351,932 | 9/1982 | Street et al. | 526/262 |
| 4,868,261 | 9/1989 | Kobayashi et al. | 526/262 |
| 4,918,152 | 4/1990 | Moritani et al. | 526/262 |
| 5,155,190 | 10/1992 | Okinaka et al. | 526/203 |

FOREIGN PATENT DOCUMENTS

| 61-103911 | 5/1986 | Japan . |
| 62-177009 | 8/1987 | Japan . |
| 01-215810 | 8/1989 | Japan . |
| 1392076 | 4/1988 | U.S.S.R. . |

*Primary Examiner*—Joseph L. Schofer
*Assistant Examiner*—Wu C. Cheng
*Attorney, Agent, or Firm*—Austin R. Miller

[57] ABSTRACT

An optical sheetlike article possessing a glass transition point and a softening point both higher than 130° C., a modulus of elasticity when bent of more than 50 kgf/mm$^2$, a double refraction index not greater than 30 nm, a yellowness index of not greater than 5, a specific gravity of not more than 1.5, an amount of deflection of not more than 10 mm in a load flexure test, and a thickness of more than 0.3 mm and not more than 0.7 mm is provided, and is ideal for use in optical filters for display devices, substrates for liquid crystal display devices, substrates for optical recording discs, and optical lenses, among others.

6 Claims, No Drawings

SHEETLIKE ARTICLE FOR OPTICAL USE

This application is a continuation of application Ser. No. 07/852,229, filed as PCT/JP91/01336 Oct. 3, 1991, published as WO92/06124 Apr. 16, 1992 abandoned.

TECHNICAL FIELD

This invention relates to sheetlike articles for optical use, these sheetlike articles being used as optical filters for display devices, as substrates for liquid crystal display devices, as substrates for optical recording discs, and as optical lenses, among other applications.

BACKGROUND ART

Heretofore, inorganic glasses having a superior heat resistance and optical properties have been used for optical plates and lenses, but such inorganic glasses are disadvantageous in that they are easily broken because they have a poor shock resistance and are heavy due to a large specific gravity thereof. Efforts have been made to overcome the drawbacks of inorganic glasses by substituting resins for the inorganic glasses, and as such thermoplastic resins, polymethyl methacrylate (PMMA), polyethylene terephthalate (PET), polycarbonate (PC), and polyether sulfones (PES) may be cited for example. These resins, however, invariably have a critical problem which hinders the use thereof as sheetlike articles for optical applications. The PMMA, for example, has a disadvantage in that it has too low a heat resistance to withstand the conditions involved in the imparting of an electroconductive transparent film thereto, and after the imparting of the electroconductive film thereto, exhibits a low heat resistance such that the transparent electroconductive film is easily cracked during the fabrication process. The PET, PC, and PES, though having a relatively good heat resistance, have too high a double refraction index to be used advantageously, particularly for sheetlike articles in optical applications such as, for example, substrates for liquid crystal display devices and substrates for optical recording discs.

Thermoplastic resins such as diethylene glycol bisallyl carbonate polymer (CR-39) have been used for the same purpose, and not unexpectedly, they have a poor heat resistance, and particularly, have low glass transition points, and therefore, cannot provide sheetlike articles giving fully satisfactory performances for optical applications.

Japanese Unexamined Patent Publications No. 131,654/1981 and No. 126,119/1983 disclose substrates made of polymers using maleimide compounds and intended for use in optical discs, but these techniques are disadvantageous in that the substrates produced thereby have a poor resistance to solvents and chemicals.

DISCLOSURE OF INVENTION

An object of this invention is to provide sheetlike articles for optical applications and having an excellent shock resistance and a very low breakage rate, and further, having a good heat resistance and optical properties.

BEST MODE OF CARRYING OUT THE INVENTION

To accomplish the above object, this invention has the following construction.

"(1) A sheetlike article for optical applications, formed of a resin exhibiting a glass transition point and a softening point both higher than 130° C., a modulus of elasticity when bent of more than 50 kgf/mm$^2$ and not exceeding 1,000 kgf/mm$^2$, a double refraction index not greater than 30 nm, a yellow color index of not more than 5, a specific gravity of not more than 1.5, and a thickness of more than 0.3 mm but less than 0.7 mm.

(2) A sheetlike article for optical applications, formed of a resin exhibiting a glass transition point and a softening point both higher than 130° C., an amount of deflection not greater than 10 mm in a load flexure test, and a thickness of more than 0.3 mm but less than 0.7 mm.

(3) A sheetlike article for optical applications, formed of a resin exhibiting a glass transition point and a softening point both higher than 130° C., an amount of deflection not greater than 20 mm in a cantilever test at 100° C., and a thickness of more than 0.3 mm but less than 0.7 mm."

The physical constants referred to in this invention are determined by the following methods.

(1) The glass transition point is determined in accordance with the method specified in Japanese Industrial Standard (JIS) K-7121. The softening point is determined by the needle insertion mode using a thermomechanical property analyzer (TMA) and reported as the point of inflection in the TMA displacement curve.

(2) The modulus of elasticity when bent is determined at 23° C. in accordance with the method specified in JIS K-6911.

(3) The double refraction index is determined by the ellipsometer method with respect to a double pulse from a light source of 633 nm.

(4) The yellow color index (YI value) is determined in accordance with the method specified in JIS K-7103 using, as a sample, a flat sheet having a length of 40 mm, a width of 40 mm, and a thickness inherent in the sample.

(5) The specific gravity is determined by a pycrometer.

(6) The amount of deflection in a cantilever test at 100° C. is determined by preparing a sample having a width of 50 mm, a length of 100 mm, and a thickness inherent in the sample, holding one end of the sample horizontally, allowing the sample to stand for two minutes in an atmosphere at 100° C., and measuring the amount of deflection in the form of the displacement of the free end of the sample from the horizontal line extended from the point at which the sample is held in the horizontal posture. In this test, the length of the sample used is 5 mm.

(7) The test for a deflection under load is performed in accordance with the method specified in JIS K-7207, with the following modifications. The sample measures 10 mm in width and 40 mm in length, the distance between the points of support of a sample support base is 10 mm, and the load is 1 kg.

For this invention, the glass transition point and the softening point must both be higher than 170° C. When the resin to be used has a glass transition point or a softening point lower than 130° C., it has a poor heat resistance, and when a substrate made of this resin is subjected to an antireflection treatment or coated with a transparent electroconductive film, it induces cracks in the antireflection film or transparent electroconductive film, and consequently, entails the problem of a breakage of wires distributed in the film while the film is undergoing a patterning treatment.

The modulus of elasticity when bent must be from 50 to 1,000 kgf/mm$^2$. When a given resin has a modulus of elasticity when bent of less than 50 kgf/mm$^2$, a thin sheet produced by molding this resin has a poor shape-retaining ability and does not allow an accurate shaping. Thus, this resin is incapable of producing sheetlike articles and lenses for optical applications requiring a high performance accuracy. When a given resin has a modulus of elasticity when bent of more than 1,000 kgf/mm², a sheet produced by molding the resin tends to have a poor shock resistance, and thus the advantages expected from the use of the resin are lost. From the standpoint of ease of fabrication, the resin must satisfy the above properties even at temperatures higher than 140° C.

The double refraction index of the resin must not be greater than 30 nm. In particular, when the resin is to be used for a substrate of a liquid crystal display device, the double refraction index is preferably be greater than 15 nm. If the resin has a double refraction index greater than 30 nm, it is not usable for optical applications. From the standpoint of optical attributes, it is essential that the double refraction index be not more than 30 nm.

The degree of yellowness of the resin measured with a colorimetric color difference meter must not be more than 5. To fulfil this requirement, the resin may include a dye having a complementary degree of chromaticity, to thus acquire an index of not more than 5. If the degree of yellowness of a given resin is more than 5, an object under observation with an optical device using the resin appears to have a color different from its inherent color, and this is a fatal drawback where the resin is used for optical applications. Therefore, it is important that the degree of yellowness be not more than 5.

The specific gravity of the resin must not be more than 1.5. Particularly, when used in optical lenses and substrates for liquid crystal display devices which especially desire a light weight, a resin having a specific gravity of not more than 1.4 is most preferable.

The amount of deflection in a cantilever test at 100° C. must not be more than 20 mm, because the sheet made of the resin must retain its shape regardless of the heat used when a thin film such as an antireflection film, a transparent electroconductive film, or an optical recording film is superposed on the sheet by the vacuum deposition technique or the spattering technique, for example. When the substrate formed of the resin produces a deflection of more than 20 mm in the cantilever test at 100° C., it does not have a sufficient shape retaining ability at elevated temperatures and thus is deformed during the fabrication process and becomes no longer usable.

The amount of inflection in the load flexure test must not be more than 10 mm, because the sheetlike article for optical applications must retain its shape during a high-order fabrication process such as a lamination, or during actual use as a finished product. When the substrate formed of the resin produces a deflection of more than 10 mm in the load flexure test, it is not easily handled during the fabrication process and thus is difficult to use in optical applications.

The resin to be used in this invention may be a thermosetting or thermoplastic type, as long as it fulfils the necessary conditions described above. The thermosetting resins effectively usable herein include epoxy type resins, vinyl type resins, and urethane type resins, for example. Particularly, vinyl type resins are preferable in that they have a superior colorlessness and transparency and exhibit an ideal releasability from the mold, for example, during the cast polymerization process. Of these vinyl type resins, those which contain a maleimide type monomer, fumarate type monomer, styrene type monomer, acryl type monomer, methacryl type monomer, and allyl type monomer as a comonomer component are preferable in that they have an excellent heat resistance and optical properties. The copolymers of these vinyl type resins with a maleimide type monomer, an acryl type monomer, or a styrene type monomer are particularly preferable. These resins have low double refraction indexes, and therefore, are ideal for use in particular as a substrate for a liquid crystal display device.

As a maleimide type monomer, the compounds represented by the following general formulas (1) and (2) are preferably used.

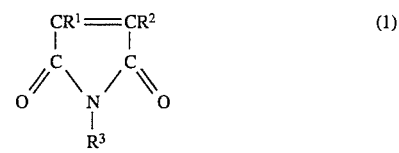

wherein $R^1$ and $R^2$ each are selected from a hydrogen atom, methyl group and ethyl group, and $R^3$ is selected from alkyl groups having 1 to 20 carbon atoms, aryl groups, aralkyl groups and cycloalkyl groups, and

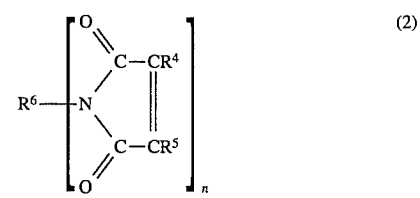

wherein $R^4$ and $R^5$ each are selected from a hydrogen atom, methyl group and ethyl group, $R^6$ stands for an organic group of the valency of n having 1 to 40 carbon atoms, which organic groups are severally bound with the nitrogen atoms of maleimide through the N—C link, and n stands for an integer of from 2 to 10 inclusive).

The maleimide type compounds represented by the general formula (1) are described below.

$R^1$ and $R^2$ may be identical to or different from each other.

As definite examples of $R^3$, linear alkyl groups such as a methyl group, ethyl group, propyl group, octyl group, and octadecyl group; branched alkyl groups such as an isopropyl group, sec-butyl group, tert-butyl group, and isopentyl group; alicyclic hydrocarbon groups such as a cyclohexyl group and methyl cyclohexyl group; aryl groups such as a phenyl group and methylphenyl group; and aralkyl groups such as a benzyl group and phenethyl group are included.

Further, $R^1$, $R^2$, and $R^3$ may be substituted by a varying substituent selected from halogeno groups such as fluorine, chlorine, and bromine and cyano group, carboxyl group, sulfonic acid group, nitro group, hydroxyl group, and alkoxy group.

As definite examples of the compounds represented by the general formula (1), N-methyl maleimide, N-n-butyl maleimide, N-phenyl maleimide, N-o-methylphenyl maleimide, N-m-methylphenyl maleimide, N-p-methylphenyl maleimide, N-o-hydroxyphenyl maleimide, N-m-hydroxyphenyl maleimide, N-p-hydroxyphenyl maleimide, N-o-methoxyphenyl maleimide, N-m-methoxyphenyl maleimide, N-p-methoxyphenyl maleimide, N-o-chlorophenyl maleimide, N-m-chlorophenyl maleimide, N-p-chlorophenyl maleimide, N-o-carboxyphenyl maleimide, N-m-carboxyphenyl maleimide, N-p-carboxyphenyl maleimide, N-o-nitrophenyl maleimide, N-m-nitrophenyl maleimide, N-p-nitrophenyl maleimide, N-ethyl maleimide, N-isopropyl maleimide, and N-isobutyl maleimide are included.

Now, the polyfunctional maleimide derivatives represented by the general formula (2) will be described.

$R^6$ is a divalent organic group where n is 2 or a trivalent organic group where n is 3. Further, $R^6$ is an organic group of the valency of 10 when n is 10. Particularly, from the viewpoint of the ease of synthesis of the monomer, the polyfunctional maleimide derivatives possessing a divalent organic group and having 2 for n allow the easiest handling. As definite examples of such divalent organic groups, alkyl groups such as a methylene group, ethylene group, and propylene group; alicyclic hydrocarbon groups such as a cyclohexylene group and methyl cyclohexylene group; and aryl groups such as a phenylene group and methylphenylene group are included. Further, the combinations of these groups such as shown below also are included.

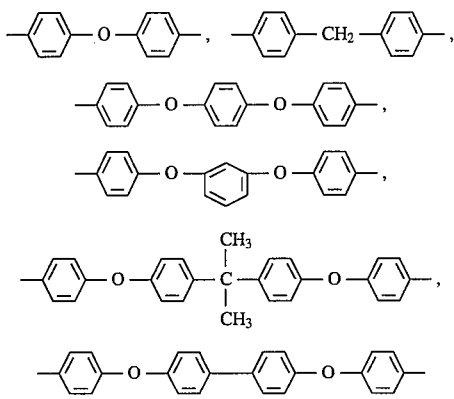

As preferable comonomers to be used in conjunction with maleimide monomers in the formation of vinyl type resins, such homopolymers as those of methyl methacrylate, bornyl (meth)acrylates, adamantyl (meth)acrylates, and phenyl (meth)acrylates, which impart Tg high values, are included. Styrene type monomers are included as other preferable comonomers. Concrete examples of such styrene type monomers include styrene, α-methyl styrene, halogenated styrenes, and halogenated α-methyl styrene.

These monomers may be used either alone or as a mixture of two or more thereof. Among the maleimide compounds mentioned above, alkyl maleimides and cycloalkyl maleimides are preferable, and N-isopropyl maleimide and N-cyclohexyl maleimide are most preferable from the viewpoint of a freedom from discoloration after a heat treatment and of the weatherability thereof. Further, from the viewpoint of the ease of preparation of a monomer mixture during the cast polymerization and the obtaining of the characteristic properties mentioned above, the combined use of an N-alkyl maleimide and an N-alicyclic alkyl maleimide such as the combination of an N-alkyl maleimide with an N-isopropyl maleimide is most preferable. Although the ratio of the N-alkyl maleimide to the N-alicyclic alkyl maleimide in the combined use is empirically fixed, depending on the kind and amount of the other monomer, preferably the proportion of the N-alicyclic alkyl maleimide as from 1 to 500 parts by weight, based on 100 parts by weight of the N-alkyl maleimide.

The copolymer to be derived from the polyfunctional maleimide type monomer represented by the general formula (2) constitutes a three-dimensionally cross-linked resin and acquires ideal characteristic properties such as an excellent resistance to solvents, and therefore, is advantageous. Especially, the combined used of this polyfunctional maleimide type monomer with the maleimide type monomer represented by the general formula (1) is preferable in that the product exhibits an ideally balanced toughness, heat-resistance, and transparency. The effect of an addition of the polyfunctional maleimide type monomer can be most obtained when the content thereof in the produced resin is from 1 to 40% by weight.

By using as a comonomer a polyfunctional monomer having at least two unsaturated groups other than the groups cited above, the resin can be three-dimensionally cross-linked. The polyfunctional monomers having two or more such unsaturated groups are described below. The expression "polyfunctional monomer having at least two unsaturated groups" means a monomer having at least two unsaturated functional groups copolymerizable with the aforementioned maleimide monomer. As concrete examples of the copolymerizable functional groups, a vinyl group, methylvinyl group, acryl group, and methacryl group are included. Monomers containing two or more different copolymerizable functional groups in the molecular unit thereof are also included in the polyfunctional monomers mentioned above.

As preferable definite examples of polyfunctional monomers having two or more such unsaturated groups as described above, di-, tri-, and tetra-(meth)acrylates of polyhydric alcohols such as ethylene glycol di(meth)acrylates, diethylene glycol di(meth)acrylates, triethylene glycol di(meth)acrylates, glycerol (di/tri)methacrylates, trimethylol propane (di/tri)(meth)acrylates, and pentaerythritol (di/tri/tetra)(meth)acrylates, aromatic polyfunctional monomers such as o-divinyl benzene, m-divinyl benzene, and p-divinyl benzene, esters such as (meth)acrylic vinyl esters and (meth)acrylicallyl esters, dienes such as butadiene, hexadiene, and pentadiene, monomers using dichlorophosphagen as a raw material and having a phosphagen backbone incorporating therein a polymerizing polyfunctional group, and polyfunctional monomers having a heterocyclic backbone such as triallyl diisocyanurate are included.

The transparent polymer of this invention preferably contains a monomer represented by the aforementioned general formula (1) in an amount of from 20 to 98% by weight. If the content of this monomer is less than 20% by weight, the transparent polymer has a poor heat resistances, mechanical strength, and double refraction index. The content of the monomer is preferably from 30 to 80%, more preferably from 40 to 60% by weight.

The polyfunctional maleimide represented by the general formula (2) or the other polyfunctional monomer having at least two unsaturated groups is preferably contained as another preferable comonomer in the polymer, in a proportion of from 2 to 40% by weight. If the content of this comonomer is less than 2% by weight, the three-dimensional cross-linking does not proceed as required, and the produced resin usually has a poor heat resistance and resistance to solvents. Conversely, if this content is more than 40% by weight, the produced resin usually has a poor shock resistance.

In the use of the polyfunctional monomer for the three-dimensional cross-linking as described above, the content of a monofunctional monomer possibly present as an extraneous component therein is preferably reduced to the fullest possible extent. The monomers to be used for the polymerization are preferably deprived of such impurities incapable of polymerization to the utmost extent, preferably to less than 1% by weight of the total amount of the composition at least. The determination of such unaltered monomers can be attained by an extraction from acetone or toluene or by a reprecipitation after the dissolution.

Further, the resin to be used in this invention preferably incorporates therein various polymerizable monomers such as mentioned above, for enhancing the mechanical strength, lowering the double refraction, heightening the refraction index, lowering the water absorption ratio, improving the dyeability, augmenting the heat resistance, and improving the shock resistance, for example. The monomers usable for this purpose include aromatic vinyl type monomers, olefin type vinyl monomers, monomers such as (meth)acrylic acids and esters thereof, and polycarboxylic anhydrides, for example. As concrete examples of such aromatic vinyl type monomers, styrene, α-methyl styrene, p-methyl styrene, p-tert-butyl styrene, vinyl toluene, chlorostyrene, and bromo-styrene are included. Particularly, in terms of performance and commercial availability, styrene, α-methyl styrene, and p-methyl styrene are most preferable.

As desirable definite examples of vinyl type monomers other than those already mentioned, vinyl cyanide type monomers such as acrylonitrile and methacrylonitrile, (meth)acrylic (ester) type monomers such as methyl acrylate, cyclohexyl methacrylate, tert-butyl methacrylate, benzyl methacrylate, acrylic acid, and methacrylic acid, and maleic anhydride are included.

The sheetlike article of this invention for optical applications is characterized by exhibiting a high modulus of elasticity when bent and therefore, has an excellent ability to retain its shape regardless of any reduction in the thickness of the sheet. Particularly, when used as a substrate for a liquid crystal display device, an optical diffusion sheet for a liquid crystal device, or a substrate for an electroluminescence, i.e., applications in various display devices preferably have a light weight and small thickness, the sheetlike article preferably has a modulus of elasticity when bent of more than 200 kgf/mm$^2$, most preferably more than 350 kgf/mm$^2$ and a thickness of more than 0.3 mm but not less than 0.7 mm, among other various requirements.

Further, for improving the weatherability, resistance to deterioration by oxidation and antistatic property, the sheetlike article may incorporate therein an ultraviolet absorbent, an antioxidant, and an antistatic agent. Particularly, a monomer capable of absorbing ultraviolet light or preventing oxidation preferably participates in the copolymerization intended to produce the resin of this invention, because this monomer can improve the properties mentioned above without a sacrifice of the chemical or heat resistance. As preferable examples of these monomers, benzophenone type ultraviolet absorbents having an unsaturated double bond, phenyl benzoate type ultraviolet absorbents having an unsaturated double bond, and (meth)acryl monomers having a hindered amino group as a substituent are included. These comonomers are preferably used in an amount of from 0.5 to 20% by weight. If this amount is less than 0.5% by weight, the added comonomer has no effect, and if the amount is more than 20% by weight, the produced copolymer has a poor heat resistance and mechanical strength.

As the benzophenone type ultraviolet absorbents having an unsaturated double bond, the compounds of a structure represented by the following general formula (3) are included.

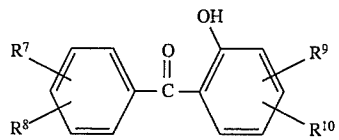

wherein at least one of the functional groups $R^7$, $R^8$, $R^9$ and $R^{10}$ is an organic group having an unsaturated double bond and the other functional groups independently stand for a hydrogen atom, alkyl group, alkenyl group, aralkyl group, aryl group, alkoxy group, aralkoxy group, aryloxy group, hydroxy group, halogeno group, sulfonic acid (ester) group, carboxylic acid (ester) group, or phosphoric acid (ester) group, although not exclusively, and these other functional groups may be the same or different.

As the phenyl benzoate type ultraviolet absorbents having an unsaturated double bond, the compounds represented by the following structural formula (4) are included.

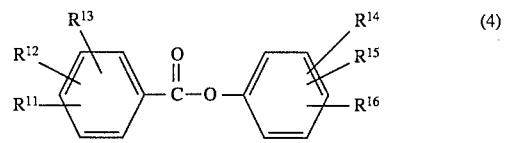

wherein at least one of the functional groups, $R^{11}$ and $R^{12}$, is an organic group having an unsaturated double bond and the other functional group stands for a hydrogen atom, alkyl group, alkenyl group, aralkyl group, aryl group, alkoxy group, aralkoxy group, aryloxy group, hydroxy group, halogeno group, sulfonic acid (ester) group, carboxylic acid (ester) group, or phosphoric acid (ester) group, although not exclusively and the two functional groups may be the same or different.

In the acryl monomers and methacryl monomers having a hindered amino group as a substituent, as the hindered amino groups, the substituents represented by the following structural formula (5) are included.

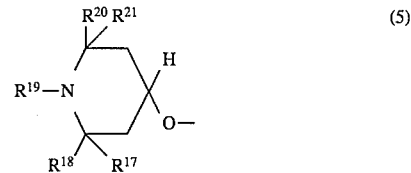

wherein $R^{17}$, $R^{18}$, $R^{20}$ and $R^{21}$ each stand for a lower alkyl of 1 to 5 carbon atoms and $R^{19}$ is selected from lower alkyl groups of 1 to 5 carbon atoms and a hydrogen atom.

The acryl or methacryl monomer having such a hindered amino group is produced by the esterification of a hydroxy-hindered amine with a various (meth)acrylic acid, or the reaction thereof with (meth)acrylic acid chloride, for example.

As definite examples of (meth)acryl monomers having such a hindered amino group as a substituent, monomers such as 2,2,6,6-tetramethyl-4-piperidinyl acrylate, 2,2,6,6-piperidinyl methacrylate, 1,2,2,6,6-pentamethyl-4-piperidinyl acrylate, and 1,2,2,6,6-pentamethyl-4-piperidinyl methacrylate are included.

The method of polymerization to be used in this invention for the production of the resin is not particularly restricted, and can be effected by any of the known methods.

When an epoxy resin is selected, the polymerization can be carried out by using an amine type, acid anhydride type, imidazole type, or varying metal compound type curing agent or a cure promoting agent, for example. Alternatively, a polymer, an oligomer, or a monomer having an active hydrogen atom such as hydroxyl group may be polymerized with an isocyanate compound. The polymerization of a vinyl type monomer system such as, for example, a maleimide type monomer, an acryl type monomer, or styrene, can be accomplished by keeping the aforementioned monomer mixture under prescribed temperature conditions in the presence or absence of a radical-generating initiator.

Regarding the method of polymerization, any of the known polymerization methods, such as bulk polymerization, solution polymerization, suspension polymerization and casting polymerization, can be adopted. As radical-generating initiators, various peroxide compounds and azo compounds are included. Particularly, from the viewpoint of preventing a possible discoloration after an application of heat, azo compounds are most preferable. As definite examples of the azo compounds, azo-nitrile compounds such as 2,2'-azobisisobutyronitrile, 1,1'-azobis(cyclohexane-1-carbonytrile), 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobis(2-methylbutyronitrile), 1-[(1-cyano-1-methylethyl)azo]-formamide, and 2-phenylazo-4-methoxy-2,4-dimethylvaleronitrile, azoamidine compounds such as 2,2'-azobis(2-methyl-N-phenylpropionamidine) dihydrochloride, cyclic azoamidine compounds such as 2,2'-azobis[2-(5-methyl-2-imidazolin-2-yl)propane] dihydrochloride, azoamide compounds such as 2,2'-azobis {2-methyl-N-[1,1-bis(hydroxymethyl)-2-hydroxyethyl] propionamide}, and alkylazo compounds such as 2,2'-azobis(2,4,4-trimethylpentane) are included. The combined use of several radical-generating initiators having different decomposition temperatures preferably is adopted, from the viewpoint of allowing a control of the reaction of polymerization. The conditions for this polymerization are fixed empirically, depending on the particular kinds of monomers and initiator to be actually used. From the viewpoint of heightening the ratio of polymerization and reducing the unaltered monomers to the fullest possible extent, the monomer mixture placed in a mold for cast polymerization is preferably heated at a temperature of more than 100° C., more preferably higher than 150° C., for at least 10 minutes. Especially when the resin is intended to form a three-dimensionally cross-linked structure, from the viewpoint of completing the polymerization, the heating is preferably carried out at a temperature of from 150° to 220° C. for not less than 10 minutes, although this varies in accordance with the particular kind of polymerization initiator actually used. The heating at a temperature higher than 220° C. exposes the monomer mixture to thermal decomposition, and thus a heating for an unduly long time is not preferable. The continuous or semicontinuous elevation of the polymerization temperature is a preferable approach to the production of an optically uniform resin.

Although this invention does not particularly discriminate the resin due to the ratio of polymerization, the ratio of polymerization is preferably as high as possible. In consideration of the possible impact of the solution coating or vacuum deposition, i.e., a post-treatment for the application of a hard coat, the ratio of polymerization is preferably more than 90%.

For the method of molding the resin of this invention, injection molding, extrusion molding, compression molding, belt-press molding, and cast molding can be used, and as a most effective molding method, the cast molding method is preferable.

As the mold to be used for the cast molding method, a glass sheet, particularly a glass sheet produced by the float method or a glass sheet having a polished surface, is advantageously used for the production of sheetlike articles having a superior surface accuracy usable for optical applications. To prevent a breakage of the glass sheet during the molding process, the glass sheet is preferably reinforced by the air cooling method or the chemical method before use. The method of using a metallic belt for a continuous cast polymerization is preferable from the viewpoint of ensuring a high productivity and an accurate control of the sheet thickness.

The sheetlike article produced by this invention for optical applications has an excellent transparency, heat resistance, lightfastness, weatherability, shock resistance, grazing property, and chemical resistance, and thus can be utilized in various display devices as a substrate for a liquid crystal display device, an optical diffusion plate for a liquid crystal display device, and a substrate for electroluminescence, and in automobiles and aeroplanes as front, side, and rear windows thereof. Also, since the sheetlike article exhibits a low double refraction index, it can be advantageously used as a substrate for an optical disc. Regarding liquid crystals, the sheetlike article of this invention can be used for the TN (twisted nematic) type liquid crystals, STN (super-twisted nematic) type liquid crystals, TFT (twisted film transistors), and ferroelectric liquid crystals, but since this sheetlike article possesses a high rigidity and excellent heat resistance, it is particularly preferably used for the STN type liquid crystals and ferroelectric liquid crystals.

This invention will be described more specifically with reference to working examples, to which this invention is not limited.

The physical constants used in the following working examples have been determined by the following methods.

(1) The glass transition temperature was determined in accordance with the method specified in JIS K-7121 using a differential thermal analyzer produced by Metler Corp and marketed under the product code of "AT3000". The softening point was determined by the needle insertion mode using a thermomechanical property analyzer (TMA). The heat distortion point herein is such that the point of inflection found in the TMA displacement curve is taken as the softening point. The determination was made by using an instrument produced by Shimadzu Seisakusho Ltd. and marketed under the product code of "TMA-30".

(2) The modulus of elasticity when bent was determined at 23° C. in accordance with the method specified in JIS K-6911.

(3) The double refraction index was determined in accordance with the Ellipsometer method with respect to a double pass from a light source of 633 nm.

(4) The index of yellowness (YI value) was determined in accordance with the method specified in JIS K-7103 using an SM color computer produced by Suga Shikenki K.K. The sample for the test was a flat sheet measuring 40 mm×40 mm×2 mm.

(5) The specific gravity was determined by using a pycnometer produced by Chow Balance K.K.

(6) The amount of deflection in the cantilever test at 100° C. was determined by preparing a sample having a width of 50 mm, a length of 100 mm, and a thickness inherent in the sample, setting the sample fast in the horizontal direction by a firm grip at one end thereof, allowing the sample to stand for two minutes in an atmosphere at 100° C., and measuring the displacement of the free end of the sample from the horizontal line extended from the point of firm grip as the amount of deflection. The length of the sample used for the first grip was 5 mm.

(7) The load flexure test was performed in accordance with the method specified in JIS K-7207, except that the sample had a width of 10 mm and a length of 40 mm, the distance between the points of support on the sample support base was 10 mm, and the load was 1 kg.

EXAMPLE 1

The following components were mixed and dissolved, subjected to cast polymerization, and then molded.

| | |
|---|---|
| N-isopropyl maleimide | 26.5 g |
| Styrene | 18.5 g |
| Divinyl benzene | 5.0 g |
| Azobisisobutyronitrile | 0.05 g |

The cast polymerization was carried out as follows.

Two identical glass sheets measuring 300 mm×300 mm×5 mm were opposed to each other across an intervening space 0.4 mm in thickness, with the peripheral edges thereof fastened with a gasket made of soft vinyl chloride resin. The monomer mixture mentioned above was placed in the space between the opposed glass sheets and polymerized at 70° C. for eight hours, and then at 100° C. for one hour, to produce a transparent cast mold sheet. The produced sheet had a thickness of 0.4 mm.

The physical properties of this case molded sheet were tested (glass transition point, softening temperature, modulus of elasticity when bent, double refraction index, index of yellowness, specific gravity, amount of deflection in the cantilever test at 100° C., and flexure under load), and the results were as follows.

| | |
|---|---|
| Glass transition point | 180° C. |
| Softening temperature | 175° C. |
| Modulus of elasticity when bent | 400 kgf/mm$^2$ |
| Double refraction index | 0 nm |
| Index of yellowness | 0.2 |
| Specific gravity | 1.14 |
| Amount of deflection in cantilever test at 100° C. | 8 mm |
| Deflection under load | 1.5 mm |

A hard coat film was deposited on the cast molded sheet as the substrate. The deposition of the hard coat film was carried out as follows. First, the hydrolyzate of γ-glycidoxypropyl trimethoxy silane was prepared as follows. In a reaction vessel provided with a rotor, 95.3 g of γ-glycidoxypropyl trimethoxy silane was placed, kept at a liquid temperature of 10° C., and stirred with a magnetic stirrer, and in the meantime, 21.8 g of an aqueous 0.01-N hydrochloric acid solution was gradually added dropwise thereto. Consequently, the hydrolyzate of γ-glycidoxypropyl trimethoxy silane was produced. Then, a coating liquid of the hard coat was prepared. The aforementioned hydrolyzate of γ-glycidoxypropyl trimethoxy silane and 216 g of methanol, 216 g of dimethyl formamide, 0.5 g of silicon type surfactant, and 67.5 g of a bisphenol-A type epoxy resin (produced by Yuka-Shell Epoxy K.K. and marketed under the trademark of "Epikote 827") added thereto were mixed. The resultant mixture and 270 g of colloidal antimony pentoxide sol having an average particle diameter of 50 mμ (produced by Nissan Chemicals Industries, Ltd. and marketed under the trademark of "Antimon Sol A-2550") and 13.5 g of aluminum acetyl acetonate added thereto were thoroughly stirred. The mixture consequently obtained was used as the hard coat coating liquid. The cast molded sheet obtained as described above was used as a substrate, immersion coated with the hard coat coating liquid at a pulling speed of 20 cm/min, then pre-dried at 100° C. for 10 minutes, and further heated at 110° C. for four hours, to superimpose a transparent hard coat film on the substrate. The hard coat film had a thickness of 3 μm. This hard coat film was further coated with layers respectively of zirconium oxide, tantalum oxide, and silicon dioxide each having an optical film thickness set at ¼ γ (γ=520 nm), by the vacuum deposition method, to form a multilayer antireflection film. This optical sheetlike article provided with the antireflection film, when tested for heat resistance at 100° C. for two hours, produced no cracks and showed no sign of change in the antireflection effect, indicating that it possessed an ideal heat resistance for an optical filter in a display device.

The cast molded sheet allowed the production of an ideal optical filter for a display device and an ideal substrate for a liquid crystal display device.

EXAMPLE 2

The following components were mixed and dissolved and molded by cast polymerization.

| | |
|---|---|
| N-isopropyl maleimide | 23.5 g |
| N-cyclohexyl maleimide | 5.0 g |
| Styrene | 15.5 g |
| Divinyl benzene | 6.0 g |
| Azobisisobutyronitrile | 0.08 g |
| 1,1-Azobis(cyclohexane-1-carbonitrile) | 0.05 g |

The cast polymerization was carried out as follows.

Two identical glass sheets measuring 300 mm×300 mm×5 mm were opposed to each other across an intervening space 0.4 mm in thickness, with the peripheral edges thereof fastened with a gasket made of soft vinyl chloride. The aforementioned monomer mixture was placed in the space between the opposed glass sheets and left polymerizing at 70° C. for one hour, at 100° C. for one hour, and then at 150° C. for one hour, to produce a transparent cast molded sheet. The produced cast molded sheet had a thickness of 0.4 mm.

The physical properties of the cast molded sheet were tested (glass transition point, softening temperature, modulus of elasticity when bent, double refraction index, index of yellowness, specific gravity, amount of deflection in the cantilever test at 100° C., and deflection under load), and the results were as follows.

| | |
|---|---|
| Glass transition point | 191° C. |
| Softening temperature | 180° C. |
| Modulus of elasticity when bent | 400 kgf/mm$^2$ |
| Double refraction index | 0 nm |
| Index of yellowness | 0.5 |
| Specific gravity | 1.14 |
| Amount of deflection in cantilever test at 100° C. | 5 mm |
| Deflection under load | 1.3 mm |

On the cast molded sheet, a combination prepared by combining the same organosiloxane type hard coat composition as used in Example 1 with 50 parts by weight of silica sol having an average particle diameter of 50 mμ was superimposed as a hard coat. The conditions for the formation of this hard coat film were the same as those of Example 1. Further, a mixed oxide of indium and tin was deposited on the hard coat film by the spattering method to produce a transparent electroconductive film about 1,000 Angstroms thick. The optical sheetlike article provided with this transparent electroconductive film when tested for heat resistance at 150° C. for two hours, produced no cracks and showed no discernible sign of change in the antireflection effect, indicating that this article possessed an ideal heat resistance as a substrate for a liquid crystal display device.

The cast molded sheet thus obtained allowed a production of an ideal optical filter for a display device and an ideal substrate for a liquid crystal display device.

EXAMPLE 3

A transparent cast molded sheet 0.7 mm thick was produced by following the procedure of Example 2, except that the distance separating the two opposed glass sheets was changed to 0.7 mm. The physical properties of this cast molded sheet were as follows.

| | |
|---|---|
| Glass transition point | 191° C. |
| Softening temperature | 180° C. |
| Modulus of elasticity when bent | 400 kgf/mm² |
| Double refraction index | 0 nm |
| Index of yellowness | 0.7 |
| Specific gravity | 1.14 |
| Amount of deflection in cantilever test at 100° C. | 2 mm |
| Deflection under load | 0.5 mm |

The cast molded sheet thus obtained allowed the production of an ideal optical filter for a display device and an ideal substrate for a liquid crystal display device.

COMPARATIVE EXAMPLE 1

By using the same cast mold for the glass sheets as used in Example 1, 50 g of diethylene glycol bisallyl carbonate and 0.01 g of diisopropyl peroxydicarbonate were mixed and dissolved and subjected to cast polymerization.

Two identical glass sheets measuring 150 mm×150 mm×5 mm were opposed to each other across an intervening space 2 mm in thickness, with the peripheral edges thereof fastened with a gasket made of soft vinyl chloride. The monomer mixture mentioned above was placed in the space between the glass sheets and left polymerizing at 40° C. for three hours, at 60° C. for one hour, and at 80° C. for one hour to produce a transparent cast molded sheet.

The physical properties of this cast molded sheet were tested (glass transition point, softening temperature, modulus of elasticity when bent, double refraction index, index of yellowness, specific gravity, amount of deflection in cantilever test at 100° C., and deflection under load), and the results were as follows.

| | |
|---|---|
| Glass transition point | 70° C. |
| Softening temperature | 65° C. |
| Modulus of elasticity when bent | 230 kgf/mm² |
| Double refraction index | 20 nm |
| Index of yellowness | 0.5 |
| Specific gravity | 1.32 |
| Amount of deflection in cantilever test at 100° C. | 50 mm |
| Deflection under load | 2.3 mm |

The cast molded sheet obtained herein was used for a trial production of an optical filter for a display device and a substrate for a liquid display device, and during the fabrication process, the polymer could not withstand the heat used for the fabrication and was deformed, and thus the aimed products could not be obtained from the sheet.

COMPARATIVE EXAMPLE 2

A sheetlike shaped article was produced from polycarbonate (produced by Teijin Kasei K.K. and marketed under the trademark of "Panlight") as a raw material by using an injection molding device. The molding conditions were a screw part temperature of 290° C. of the injection molding device, a mold temperature of 100° C., and an injection pressure of 1,000 kg/cm². The shaped article had a thickness of 0.4 mm.

The physical properties of this shaped sheet were tested (glass transition point, softening temperature, modulus of elasticity when bent, double refraction index, index of yellowness, specific gravity amount of deflection in cantilever test at 100° C. and deflection under load), and the results were as follows.

| | |
|---|---|
| Glass transition point | 140° C. |
| Softening temperature | 125° C. |
| Modulus of elasticity when bent | 240 kgf/mm² |
| Double refraction index | 35 nm |
| Index of yellowness | 0.7 |
| Specific gravity | 1.20 |
| Amount of deflection in cantilever test at 100° C. | 8 mm |
| Deflection under load | 2.2 mm |

The shaped sheet obtained in Comparative Example 2 was used for a trial production of an optical filter for a display device and a substrate for a liquid crystal display device, and was consequently found to possess too high a double refraction index to be used for the products aimed at.

INDUSTRIAL APPLICABILITY

The sheetlike article obtained by this invention for optical applications has an excellent transparency, heat resistance, light-fastness, weatherability, shock resistance, grazing property, and chemical resistance, and therefore, is favorably usable in various display devices such as optical filters for display devices, light diffusion sheets for liquid crystal display devices, and substrates for electroluminescence, and in automobiles and aeroplanes for the front, side, and rear windows thereof. Also, because of a low double refraction index, it is ideally usable as substrates for optical discs.

We claim:

1. A resinous sheetlike article or optical applications, said article having both a glass transition point and a softening point of higher than 130° C., a modulus of elasticity when bent of more than 50 kgf/mm² and not more than 1,000 kgf/mm², a double refraction index of not greater than 30 mm, a yellow color index of not higher than 5, a specific gravity of not more than 1.5, and a thickness of more than 0.3 mm and not more than 0.7 mm, and said article consisting essentially of a resin three-dimensionally cross-linked by cast polymerization of a mixture consisting essentially of vinyl monomers selected from the group consisting of maleimides, acryls, methacryls, fumerates, allyls, styrenes, and divinylbenzenes.

2. A resinous sheetlike article for optical applications, said article having both a glass transition point and softening point higher than 170° C., an amount of deflection of not more than 10 mm in a load flexure test, and a thickness of more than 0.3 mm and not more than 0.7 mm, and said article consisting essentially of a resin three-dimensionally cross-linked by cast polymerization of a mixture consisting essentially of vinyl monomers selected from the group consisting of maleimides, acryls, methacryls, fumerates, allyls, styrenes, and divinylbenzenes.

3. A resinous sheetlike article for optical applications, said article having both a glass transition point and a softening point higher than 170° C., an amount of deflection of not more than 20 mm in a cantilever test at 100° C., and a thickness of more than 0.3 mm and not more than 0.7 mm, and said article consisting essentially of a resin three-dimensionally cross-linked by cast polymerization of a mixture consisting essentially of vinyl monomers selected from the group consisting of maleimides, acryls, methacryls, fumerates, allyls, styrenes, and divinylbenzenes.

4. An optical sheetlike article according to claim 2, wherein the specific gravity of the article is not less than 0.8 and not more than 1.5 and the double refraction index is not more than 30 nm.

5. A resinous sheetlike article for optical applications, said article having both a glass transition point and a softening point of higher than 130° C., a modulus of elasticity when bent of more than 50 kgf/mm$^2$ and not more than 1,000 kgf/mm$^2$, a double retraction index of not greater than 30 nm, a yellow color index of not higher than 5, a specific gravity of not more than 1.5., and a thickness of more than 0.3 mm and not more than 0.7 mm, and said article consisting essentially of a resin three-dimensionally cross-linked by means of divinylbenzene and produce by cast polymerization, wherein the resin is a copolymer containing a monomer represented by the general formula (1) in an amount of not less than 20% by weight and not more than 98% by weight:

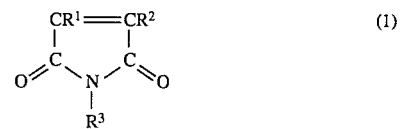

wherein $R^1$ and $R^2$ each are selected from the group consisting of a hydrogen atom, methyl group and ethyl group, and $R^3$ is selected from the group consisting of alkyl groups having 1 to 20 carbon atoms, aryl groups, aralkyl groups and cycloalkyl groups.

6. An optical sheetlike article according to claim 1, wherein the resin is a copolymer obtained by polymerizing a composition containing divinylbenzene in an amount of not less than 2% by weight and not more than 80% by weight.

* * * * *